(12) United States Patent
Nielsen et al.

(10) Patent No.: US 6,734,242 B2
(45) Date of Patent: May 11, 2004

(54) COMPOSITION

(75) Inventors: Bjarne Nielsen, Hovedgard (DK); Flemming Vang Sparsø, Skanderborg (DK)

(73) Assignee: Danisco A/S, Copenhagen (DK)

( * ) Notice: Subject to any disclaimer, the term of this patent is extended or adjusted under 35 U.S.C. 154(b) by 0 days.

(21) Appl. No.: 10/163,901

(22) Filed: Jun. 5, 2002

(65) Prior Publication Data

US 2002/0195584 A1 Dec. 26, 2002

Related U.S. Application Data

(63) Continuation-in-part of application No. 09/642,480, filed on Aug. 18, 2000.
(60) Provisional application No. 60/296,391, filed on Jun. 6, 2001.

(30) Foreign Application Priority Data

Aug. 8, 2001 (GB) .............................................. 0119340

(51) Int. Cl.⁷ ................................................. C08K 5/09
(52) U.S. Cl. ...................... 524/287; 524/306; 524/311; 524/312; 524/313; 524/504; 524/563; 524/567; 524/568; 524/569
(58) Field of Search ................................ 524/287, 306, 524/311, 312, 313, 504, 563, 567, 568, 569

(56) References Cited

U.S. PATENT DOCUMENTS

| | | | | |
|---|---|---|---|---|
| 4,426,477 A | * | 1/1984 | Yasumatsu et al. | ......... 524/306 |
| 5,420,315 A | | 5/1995 | Uhrig et al. | |
| 6,124,379 A | | 9/2000 | Chobert et al. | |

FOREIGN PATENT DOCUMENTS

| | | |
|---|---|---|
| EP | 0 503 897 A1 | 9/1992 |
| EP | 0 781 820 A2 | 7/1997 |
| WO | WO 01/144466 A1 | 3/2001 |

* cited by examiner

*Primary Examiner*—William Cheung
(74) *Attorney, Agent, or Firm*—Frommer Lawrence & Haug; Thomas J. Kowalski

(57) ABSTRACT

There is provided a composition comprising i) a pigment ii) a compound having the formula

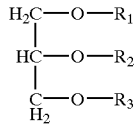

wherein $R_1$, $R_2$ and $R_3$ are independently selected from an acyl group or a hydrogen atom, wherein at least one of $R_1$, $R_2$ and $R_3$ is an acyl group (a short acyl group) having from 2 to 5 carbon atoms, wherein at least one of $R_1$, $R_2$ and $R_3$ is a branched chain acyl group (a long acyl group) consisting of a chain having 10 to 20 carbon atoms and a hydrophilic branch group.

20 Claims, No Drawings

COMPOSITION

RELATED APPLICATIONS

This application is a continuation-in-part of U.S. application Ser. No. 09/642,480, filed Aug. 18, 2000 pending. This application also claims priority from U.S. provisional application 60/296,391, filed Jun. 6, 2001, and UK application 0119340.8, filed Aug. 08, 2001. Each of the foregoing applications and patents, and each document cited or referenced in each of the foregoing applications and patents, including during the prosecution of each of the foregoing applications and patents ("application cited documents") and any manufacturer's instructions or catalogues for any products cited or mentioned in each of the foregoing applications and patents and in any of the application cited documents, are hereby incorporated herein by reference. Furthermore, all documents cited in this text, and all documents cited or referenced in documents cited in this text, and any manufacturer's instructions or catalogues for any products cited or mentioned in this text, are hereby incorporated herein by reference.

FIELD OF THE INVENTION

The present invention relates to a composition. In particular, the present invention relates to a composition comprising a pigment and a compound which acts as a dispersant, and methods for making and using the composition.

Liquid compositions containing a pigment typically require a dispersant to maintain the stability of the dispersant in the liquid carrier. Dispersants of the prior art have included adipates such as such as dioctyl adipate (DOA) and phthalate plasticisers such as dioctyl phthalate (DOP). The safety of these plasticisers has been called into question, particularly in certain applications and there is a desire to avoid their use.

Particular areas in which pigment dispersants have been used is in the provision of colourants for plastics, printing inks, and paints and lacquers.

As discussed in U.S. Pat. No. 5,308,395, traditionally, plastics have been coloured by tumble blending the plastic with a solid colourant or additive concentrate such as a colouring powder. The blended material is then fed into an extruder or moulding machine where the resin and the colourant are plasticised and the colourant is incorporated into the molten plastic. However, this method has a number of drawbacks. In many cases, a solid colourant or additive concentrate does not uniformly mix with plastic, or it does not disperse uniformly during moulding. Further, solid colourants often segregate from the plastic during pre-moulding handling because of particle size or specific gravity differences.

In recent years, liquid colour compositions have been developed in an effort to overcome the disadvantages of the traditional solid colourants. Being liquids, these colourant concentrates may be accurately metered directly into moulding machines or extruders by in-line metering systems, which help overcome many of the disadvantages of solid colourants.

As discussed in U.S. Pat. No. 5,531,819 printing inks are commonly used in ink jet printing systems. There have been proposed various kinds of ink jet recording systems, for example, a so-called electric field control system of jetting out ink by utilising an electrostatic attraction force; a so-called drop-on-demand system of jetting out ink by utilising a vibrational pressure of a piezo element (pressure pulse system); and a so-called thermal ink jet system of jetting out ink by utilising a pressure resulting from forming and growing bubbles by heating at high temperatures, and they can provide images of extremely high resolution.

For many ink jet systems, an aqueous ink using water as a main solvent and an oil ink using an organic solvent as a main solvent have generally been used. Printed images obtained by using the aqueous ink are generally poor in water proofing, whereas the oil ink can provide printed images of excellent waterproofing. U.S. Pat. No. 5,531,819 proposes plasticisers which may be used in oil inks.

As discussed in U.S. Pat. No. 4,230,609 pigments may also be delivered in the form of water reducible coatings. A water reducible coating is defined to be a colloidal dispersion in an organic solvent and water whose resin concentration can be reduced with water or solvent, which when reduced with a coalescing solvent forms a durable coating when applied to a substrate surface. Other names applied to water reducible coatings are water-borne, water solubilised, and water dilutable.

In a first aspect the present invention provides a composition comprising i) a pigment ii) a compound having the formula

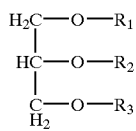

wherein $R_1$, $R_2$ and $R_3$ are independently selected from an acyl group or a hydrogen atom, wherein at least one of $R_1$, $R_2$ and $R_3$ is an acyl group (a short acyl group) having from 2 to 5 carbon atoms, wherein at least one of $R_1$, $R_2$ and $R_3$ is a branched chain acyl group (a long acyl group) consisting of a chain having 10 to 20 carbon atoms and a hydrophilic branch group.

The dispersant of the present invention is (i) cost effective as it may synthesised from readily available products, for example castor oil, (ii) produces a stable dispersion with a wide variety of organic and inorganic pigments and dyes, (iii) allows for high pigment loads, and/or (iv) possess good shelf stability and uniformity.

In one aspect the composition of the invention is a pigment composition for colouring a polymer. In this aspect further advantages are observed.

The dispersant is compatible with a wide variety of commercial thermoplastic resins, is suitable for use in conventional in-line metering and blending equipment, produces uniform colour finished products without visible streaks or specks, eliminates screw slippage and/or is stable at the temperatures normally encountered in plastics moulding and extrusion equipment.

In one aspect the composition of the invention is a pigment composition for an ink. In this aspect further advantages are observed. The composition of the invention allows the provision of a hot melt ink, which is optimum as an ink for hot melt type ink jet recording, capable of reducing the heat of fusion without increasing the viscosity of the ink as a whole, improving transparency, providing plasticity, reducing haze (representing the extent of cloud, also referred as cloudiness), providing luster and/or easily dissolving a dye as a colorant and capable of providing a sufficient solubility, particularly to a black or cyanine dye.

In one aspect the composition of the invention is, or is usable in, a water reducible coating. In this aspect further advantages are observed. The composition of the invention may (i) provide for lower solvent cost; (ii) lower the amount of organic solvent used to decrease atmospheric pollution; (iii) lower phase inversion viscosity—the point at which the organic solvent (to which mixture water is being added) changes from a water-in-oil dispersion to an oil-in-water dispersion. This would make mixing easier and would require less energy to make up the composition; (iv) increase the solids content of the composition, to give coatings offering improved protection to substrate surfaces, without at the same time thickening the material and making it difficult to apply; (v) act as a plasticiser and therefore allow for a decrease in the addition of further plasticiser which in some applications may be detrimental to the coating, being extractable from the coatings by solvents; (vi) decrease carboxyl group content of the resin to decrease further the water sensitivity of the final coating.

In one aspect, the present invention provides a composition as herein defined in a medium.

Dispersant

In the present specification by the term dispersant it is meant that the compound may assist in the dispersion of a pigment in a medium. The medium may be for example a carrier, a solvent or a solid such as a polymer.

Preferably two of $R_1$, $R_2$ and $R_3$ are short acyl groups as described above and the other of $R_1$, $R_2$ and $R_3$ is a long acyl group as described above. In this aspect, the compound may be of the formula

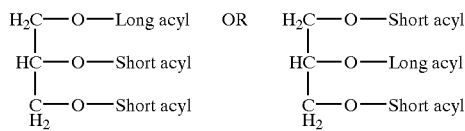

Preferably the hydrophilic branch group is a group selected from acyl and derivatives thereof. Preferred derivatives include groups of the formula —O—acyl.

Preferably the hydrophilic branch group is a group of the formula

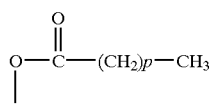

wherein p is from 0 to 3.

In a preferred aspect of the present invention the chain of the long acyl group consists of a chain having 14 to 20 carbon atoms. In a more preferred aspect, the chain of the long acyl group consists of a chain having 16 to 20 carbon atoms.

Preferably the long acyl group is of the formula

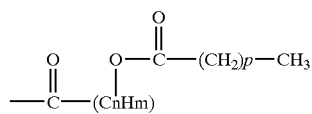

wherein n is from 10 to 20 and m is selected from 2n, 2n-2, 2n-4 and 2n-6, and wherein p is from 0 to 3.

Preferably n is from 16 to 20, more preferably from 16 to 18, yet more preferably 17.

Preferably m is 2n or 2n-2.

Preferably the group CnHm is a straight chain hydrocarbon group. The straight chain hydrocarbon group may be saturated or unsaturated. In one aspect, the straight chain hydrocarbon group contains a single —C=C— bond.

In a highly preferred aspect the long acyl group is a group of the formula

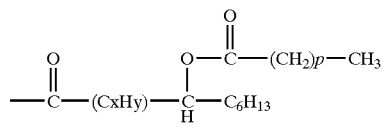

wherein x is from 7 to 10, preferably x is 10, and y is 2x or 2x-2, and wherein p is from 0 to 3, preferably p is 0.

Preferably the group CxHy is a straight chain hydrocarbon group. The straight chain hydrocarbon group may be saturated or unsaturated. In one aspect, the straight chain hydrocarbon group contains a single —C=C— bond.

In a highly preferred aspect the long acyl group is a group of the formula

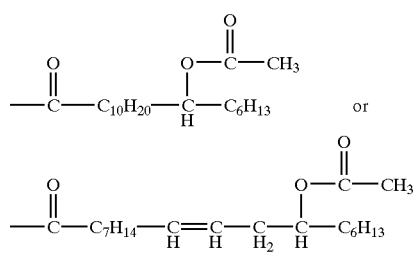

In a preferred aspect of the present invention the short acyl group is an acyl group having from 2 to 5 carbon atoms. In a more preferred aspect, the short acyl group is an acyl group having 2 carbon atoms. The short acyl group is preferably of the formula

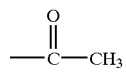

Preferably the short acyl group and the hydrophilic branch group contain the same number of carbon atoms. In a highly preferred aspect the hydrophilic branch group of the formula

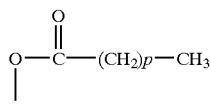

and the short acyl group is the formula

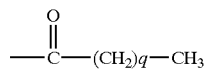

wherein p=q and is from 0 to 4 or 0 to 3.

In certain aspects, it is desirable for the short acyl groups to be present in a maximum amount with respect to the total amount of glycerol and esters thereof present in the composition. Preferably the short acyl group is present in an amount, on average, of no greater than 2 moles per mole of glycerol and esters thereof present in the composition.

In certain aspects, it is desirable for the long acyl groups to be present in a minimum amount with respect to the total amount of glycerol and esters thereof present in the composition. Preferably the long acyl group is present in an amount, on average, of at least 0.4 moles, preferably from 0.9 to 2 moles, more preferably from 0.9 to 1 moles per mole of glycerol and esters thereof present in the composition.

It may also be preferred for the majority of the glycerol present in the composition to be fully acylated. Accordingly, in a preferred aspect the total amount of acyl groups is, on average, 2.7 to 3.0 moles per mole of glycerol and esters thereof.

In a highly preferred aspect the compound of the present invention is selected from compounds of the formula

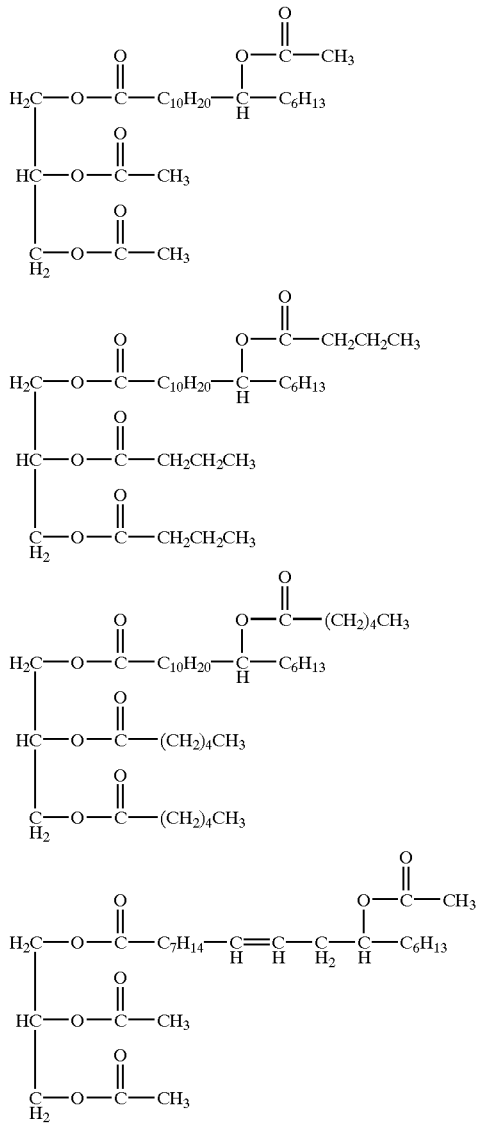

The present invention further provides a composition comprising a pigment and a compound of the formula

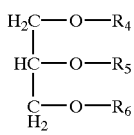

wherein two of $R_4$, $R_5$, and $R_6$ are of the formula

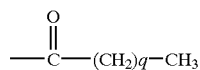

wherein for each of the two of $R_4$, $R_5$, and $R_6$ q is independently selected from 0 to 3 and the other of $R_4$, $R_5$, and R6 is a branched group of the formula

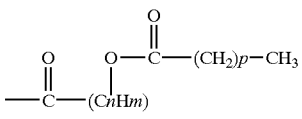

wherein n is from 10 to 20 and m is selected from 2n, 2n-2, 2n-4 and 2n-6, and wherein p is from 0 to 3.

Preferably q is 0. More preferably for both of the two of $R_4$, $R_5$, and $R_6$ q is 0.

Preferably n is from 16 to 20, more preferably from 16 to 18, yet more preferably 17.

Preferably m is 2n or 2n-2.

Preferably the group CnHm is a straight chain hydrocarbon group. The straight chain hydrocarbon group may be saturated or unsaturated. In one aspect the straight chain hydrocarbon group contains a single —C=C— bond.

In a preferred aspect the branched group is a group of the formula

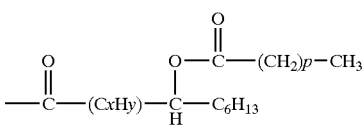

wherein x is from 7 to 10, preferably x is 10, and y is 2x or 2x-2, and wherein p is from 0 to 3, preferably p is 0.

Preferably the group CxHy is a straight chain hydrocarbon group. The straight chain hydrocarbon group may be saturated or unsaturated. In one aspect, the straight chain hydrocarbon group contains a single —C=C— bond.

In one aspect, the present invention provides a pigment dispersing compound comprising a compound having the formula

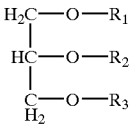

wherein $R_1$, $R_2$ and $R_3$ are independently selected from an acyl group or a hydrogen atom, wherein at least one of $R_1$, $R_2$ and $R_3$ is an acyl group (a short acyl group) having from 2 to 5 carbon atoms, wherein at least one of $R_1$, $R_2$ and $R_3$ is a branched chain acyl group (a long acyl group) consisting of a chain having 10 to 20 carbon atoms and a hydrophilic branch group.

In this aspect, preferably the present invention provides a pigment dispersing compound comprising a compound as herein defined.

Method and Kit

In one aspect, the present invention provides a method for preparing a composition as herein defined, the method comprising admixing or contacting i) a pigment ii) a compound having the formula

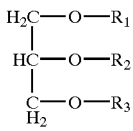

wherein $R_1$, $R_2$ and $R_3$ are independently selected from an acyl group or a hydrogen atom, wherein at least one of $R_1$, $R_2$ and $R_3$ is an acyl group (a short acyl group) having from 2 to 5 carbon atoms, wherein at least one of $R_1$, $R_2$ and $R_3$ is a branched chain acyl group (a long acyl group) consisting of a chain having 10 to 20 carbon atoms and a hydrophilic branch group.

In one aspect, the present invention provides a method for dispersing a pigment or for improving pigment dispersing, the method comprising admixing or contacting the pigment with a compound having the formula

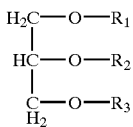

wherein $R_1$, $R_2$ and $R_3$ are independently selected from an acyl group or a hydrogen atom, wherein at least one of $R_1$, $R_2$ and $R_3$ is an acyl group (a short acyl group) having from 2 to 5 carbon atoms, wherein at least one of $R_1$, $R_2$ and $R_3$ is a branched chain acyl group (a long acyl group) consisting of a chain having 10 to 20 carbon atoms and a hydrophilic branch group; optionally in a medium.

In one aspect, the present invention provides a kit for preparing a composition as herein defined, the kit comprising i) a pigment ii) a compound having the formula

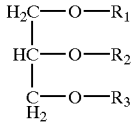

wherein $R_1$, $R_2$ and $R_3$ are independently selected from an acyl group or a hydrogen atom, wherein at least one of $R_1$, $R_2$ and $R_3$ is an acyl group (a short acyl group) having from 2 to 5 carbon atoms, wherein at least one of $R_1$, $R_2$ and $R_3$ is a branched chain acyl group (a long acyl group) consisting of a chain having 10 to 20 carbon atoms and a hydrophilic branch group; in separate packages or containers; optionally with instructions for admixture and/or contacting and/or use.

In a preferred aspect, the kit further includes a medium, wherein the medium can be included with the pigment, or with the compound, or with both the pigment and the compound, or in a separate package or container.

Process for Dispersant Preparation

The compound of the present invention may be prepared by interesterification between glycerol and one or more oils, including natural oils and hardened natural oils followed by acylation. Processes for the production of compounds in accordance with the present invention are disclosed in WO 01/14466. For example, the compound of the present invention may be the product of a two part process comprising (i) an interesterification between glycerol and an oil selected from castor oil, including hardened castor oil, unhardened castor oil and mixtures thereof, and (ii) acylation.

For example the compound may be prepared from castor oil or hardened castor oil. A typical fatty acid profile of castor oil and hardened castor oil is given below.

| Castor Oil | | Hardened Castor Oil | |
|---|---|---|---|
| Fatty Acid | Content [%] | Fatty Acid | Content [%] |
| Palmitic (C16) | 1.0 | Palmitic (C16) | 1.3 |
| Stearic (C18) | 1.1 | Stearic (C18) | 9.3 |
| Oleic (C18:1) | 3.8 | Oleic (C18:1) | 0.9 |
| Linoleic (C18:2) | 4.4 | Linoleic (C18:2) | 0.2 |
| Linolenic (C18:3) | 0.5 | Arachidic (C20) | 0.7 |
| Gadoleic (C20:1) | 0.5 | Hydroxystearic (HO-C18:0) | 84.9 |
| Ricinoleic (HO-C18:1) | 87.4 | | |

The nomenclature in parenthesis is Cxx:y where xx is the fatty acid carbon number and y indicates number of double bonds. Ricinoleic acid and hydroxystearic acid (also known as ricinoleic acid, hard) each have a hydroxyl group (OH) on the $12^{th}$ carbon.

Pigment

The term "pigment" when used herein denotes any conventional inorganic or organic pigment, dyestuff in particular organic dyestuffs, or carbon black. Those skilled in the art will be aware of suitable inorganic pigments, organic pigments and dyestuffs useful as colourants. Such materials are described, for example, in Kirk-Othmer Encyclopedia of Chemical Technology, Third Edition, Vol. 6, pages 597–617, which is incorporated by reference herein. The pigment of the compositions of the present invention may be or comprise (1) inorganic types such as titanium dioxide, carbon black, iron oxide, zinc chromate, cadmium sulfides, chromium oxides, sodium aluminium silicate complexes, such as ultramarine pigments, metal flakes and the like; and (2) organic types such as azo and diazo pigments, phthalocyanines, quinacridone pigments, perylene pigments, isoindolinone, anthraquinones, thioindi-go, solvent dyes and the like.

Various conventional additives or mixtures thereof may also be included in the compositions of the invention such as, for example, lubricants, antistats, impact modifiers, antimicrobials, light stabilisers, filler/reinforcing materials (e.g., $CaCO_3$), heat stabilisers, re-lease agents, rheological control agents such as clay, etc.

In a preferred aspect the pigment is or comprises a blend of a pigment, preferably a pigment as defined above, and a second pigment.

Coloured Systems

Polymer Systems

The compositions of the present invention may be used to colour or incorporate additives into a wide variety of polymeric resins and find equal application in modification of both thermoplastic and thermoset resins. For example, the colour concentrates of the invention are generally compatible with, and may be used with the following resins: polyolefins such as LLDPE, HDPE, LDPE, homopolymer and copolymer polypropylenes, EVA, etc.; styrenics such as crystal polystyrene, HIPS, MIPS, etc.; copolymer resins, resin blends and alloys such as ABS, polyphenylene ether (including PPO blends such as NORYLRTM®™), various engineering polymer alloys; polyamide resins, such as Nylon 6, 6/6, 11, 12, copolymers, terpolymers, etc.; acrylic resins, polycarbonates, and other amorphous resins; polyesters, such as PET, PBT, and others—both thermoplastic and curing, as well as resins reinforced with glass, quartz, carbon, aramid, or the like, fibres.

Preparation of the composition of the invention can be by any of a number of methods known in the art including those set forth in Patton, Paint Flow and Pigment Dispersion, John Wiley and Sons (1979) and Weber, ed., colouring of Plastics, SPE Monographs, John Wiley and Sons (1979) which are incorporated by reference herein.

The composition of the invention may be added to a polymeric resin to be coloured in amounts up to about 10%, for example up to about 5%, based on the weight of the resin. The amount used is often referred to as the "letdown" or "letdown ratio" and is normally dependent on the colour intensity desired or required level of additive. Also, admixtures of one or more compositions may be employed to vary the colour or other properties of the resin.

A polymeric resin may be coloured by the composition of the present invention by intimate mixing. "Intimate" mixing means that the mixture is prepared with sufficient mechanical shear and thermal energy to produce a dispersed phase which is finely divided and homogeneously dispersed in the continuous or principal phase. For example, a particularly useful procedure is to intimately mix the polymeric resin with one or more compositions using conventional mixing equipment such as a mill, a Banbury mixer, a Brabender torque rheometer, a single or twin screw extruder, continuous mixers, kneaders, etc. The polymers may be intimately mixed in the form of granules, pellets, and/or powder in a high shear mixer. One preferred process for colouring polymeric resins according to the invention utilises an in-line metering system for direct incorporation of the composition into a polymer resin at the extruder or moulding machine. The composition may be added in measured amounts to the polymeric resin either by tumbling with the resin or by pumping the composition into the feed throat of a plastic machine or preferably metering into the polymer's melt stream.

Ink Systems

As the colorant used for the ink of the present invention, any known dyes and pigments used in ink compositions may be used, for example.

As the pigment, either organic pigment or inorganic pigments used generally in the field of the printing technology can be used. Specifically, the following known pigments can be used with no particular restriction, for example, carbon black, cadmium red, molybdenum red, chromium yellow, cadmium yellow, titanium yellow, chromium oxide, viridian, titanium cobalt green, ultramarine blue, prussian blue, cobalt blue, azo pigment, phthalocyanine pigment, quinocridone pigment, isoindolinone pigment, dioxazine pigment, threne pigment, perylene pigment, perinone pigment, thioindigo pigment, quinophthalone pigment and metal complex pigment.

As the dye, oil-soluble dyes, for example, azo dye, disazo dye, metal complex dye, naphthol dye, anthraquinone dye, indigo dye, carbonium dye, quinone imine dye, cyanine dye, quinoline dye, nitro dye, nitroso dye, benzoquinone dye, naphthoquinone dye, xanthene dye, phthalocyanine dye and metal phthalocyanine dye are preferred, but not required.

The dye and the pigment may be used alone or in combination and contained within a range from about 0.1 to about 10% by weight, preferably, about 0.5 to about 8% by weight, and, more preferably, from about 0.7 to about 5% by weight based on the entire ink.

The compound of the present invention, which aids water resistance and abrasion resistance of the image printed with the printing ink of this invention, can be employed in an amount within the range of 0.1–10% by weight of the resin content, such as 2–10% by weight, and preferably about 4–6% by weight of the resin.

Paint/Lacquer Systems

The paint/lacquer systems of the present invention may comprise one or more of

Resin—a resin comprising units selected from
1. at least one hard hydrophobic enhancing monomer selected from styrene, .alpha.-methyl styrene, acrylonitrile, vinyl toluene, methyl methacrylate, vinyl chloride and vinylidene chloride;
2. at least one soft hydrophobic enhancing monomer selected from at least one acrylate selected from methyl acrylate, ethyl acrylate, butyl acrylate, 2-ethylhexyl acrylate, lauryl acrylate, isodecyl methacrylate, butyl methacrylate, isobutyl methacrylate, at least one vinyl ether selected from ethyl, butyl, octyl, decyl, and cetyl vinyl ether and/or at least one diene selected from 1,3-butadiene, isoprene and 2,3-dimethyl butadiene, provided that said dienes of monomer part (2) are not mixed together and copolymerized with vinyl chloride or vinylidene chloride; and
3. at least one hydrophilic enhancing organic acid selected from acrylic, methacrylic, fumaric, itaconic and maleic acid;

The resins can be produced by reaction of the monomers in an aqueous emulsion medium. The principles of emulsion polymerization are discussed in the following references: Synthetic Rubber, WHITBY G. S., ed., John Wiley & Sons, 1954, Ch. 8; Emulsion Polymerization, Bovey F. A. et. al., Vol. IX of High Polymers, Interscience Publishers, Inc., 1955; and U.S. Pat. No. 3,714,122, col. 5, lines 41–67 and col. 6, lines 11–59.

A water soluble solvent—selected from ethylene glycol monomethyl ether, ethylene glycol monoethyl ether, ethylene glycol monobutyl ether, diethylene glycol monobutyl ether, diethylene glycol monoethyl ether acetate, diethylene glycol diethyl ether, ethylene glycol monomethyl ether acetate, dipropylene-glycol methyl ether, methyl ethyl ketone, propylene glycol ethyl ether, propylene glycol isopropyl ether, propylene glycol butyl ether, acetone, methyl propyl ketone and diacetone alcohol;

A plasticiser—having a melting point of about −40° C. to about 25° C., a boiling point of at least 95° C. and a solubility parameter of about 8 to about 16;

A volatile amine—in sufficient amount to result in a pH of from 8 to 14 for the composition;

Water—in a volume ratio to the other volatile components of at least 80:20;

Of the various water soluble solvents which can be used, generally the ethylene glycol monobutyl ether, ethylene glycol monoethyl ether, diethylene glycol monomethyl ether, diethylene glycol monoethyl ether and diethylene glycol monobutyl ether are preferred.

Representative of the various volatile amines which may be used to form the water reducible compositions are: primary amines such as ethyl amine, propyl amine, butyl amine, isoamyl amine, amyl amine, hexyl amine, heptyl amine and ethanol amine; secondary amines such as diethyl amine, ethyl ethanol amine, and morpholine; and tertiary amines such as dimethylethanol amine, trimethyl amine, triethylamine and N-methyl morpholine. Sufficient amine is added to achieve a pH in the final water dispersion of from about 8 to about 14, preferably 9.0 to 10.0.

The water insoluble solvent is generally selected from the group consisting of mineral spirits, ketones (e.g. methyl isobutyl ketone, MIBK), aromatic cycloparaffins, esters and acetates. It is either a true solvent for the resin or forms a true solvent for the resin when it is mixed with the water soluble solvent.

The invention will now be described in further detail in the following Examples.

EXAMPLES

Dispersants Evaluated

Four dispersants were evaluated. These were:

Dispersant A—a compound having the structure

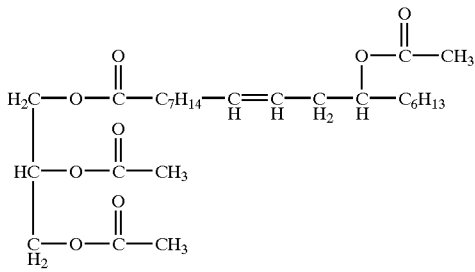

Dispersant B—a compound having the structure

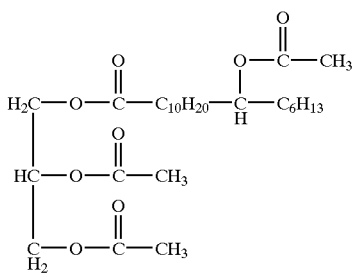

Dispersant C—a compound having the structure

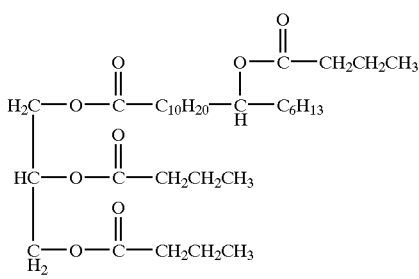

Dispersant D—a compound having the structure

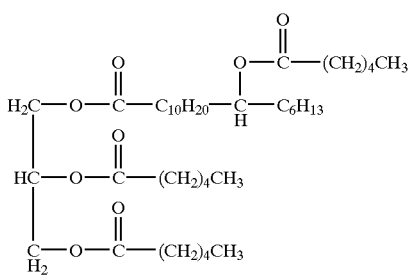

Synthesis

Dispersant compositions containing approximately 90 wt % of the above compounds were prepared from castor oil and hardened castor oil in accordance with the teaching of WO 01/14466. The respective dispersant compositions are denoted using the notation of the respective dispersant compound.

EXAMPLES 1–5

Polymer Systems

In Examples 1–5, white and black colour concentrates are formulated in the indicated proportions by dissolving the low molecular addition polymer and Emersol 213 oleic acid in the solvent, then adding the pigment under agitation, and dispersing the pigment at high speed until a uniform, stable dispersion is achieved, usually in about 30 minutes. The white pigment is DuPont R-900 titanium dioxide. The black pigment is Columbian Carbon Raven 1255.

Nine parts of the white colour concentrate and 1 part of the black colour concentrate are then mixed to form a mixed colour concentrate. One part of the mixed concentrate is tumble blended with 99 parts of Shell polypropylene resin 5824S, and moulded into 3 mm thick panels in a conventional laboratory scale injection moulding machine. No screw slippage is observed in any of these examples, and all of the moulded panels have a uniform colour with no visible specks or streaks.

Example 1

The white colourant is made from 19.0 parts of Amoco Indopol H-1900 polybutene, 19.0 parts of composition A, 2.0 parts of oleic acid, and 60.0 parts of titanium dioxide.

The black colourant is made from 40.37 parts Indopol H-1900 polybutene, 40.38 parts of composition A, 4.25 parts of oleic acid, and 15.0 parts of carbon black.

Example 2

The white colourant is made from 19.0 parts of Hercules Piccolastic A75 polystyrene, 19.0 parts of composition B, 2.0 parts of oleic acid, and 60.0 parts of titanium dioxide.

The black colourant is made from 40.37 parts of Piccolastic A75, 40.38 parts of composition B, 4.25 parts of oleic acid, and 15.0 parts of carbon black.

Example 3

The white colourant is made by mixing 19.0 parts of a poly-alpha-methyl styrene/vinyl toluene resin, 19.0 parts of composition C, 2.0 parts of oleic acid, and 60.0 parts of titanium dioxide.

The black colourant is made by mixing 40.37 parts of the same poly-alpha-methyl styrene/vinyl toluene resin, 40.38 parts of composition C, 4.25 parts of oleic acid, and 15.0 parts of carbon black.

Example 4

The white colourant is made by mixing 11.4 parts of a polymethylmethacrylate resin having a molecular weight of about 8000, 26.6 parts of composition D, 2.0 parts of oleic acid, and 60.0 parts of titanium dioxide.

The black colourant is made by mixing 24.22 parts of the same acrylic resin, 56.53 parts of composition D, 4.25 parts of oleic acid, and 15.0 parts of carbon black.

Example 5

The white colourant is made from 15.2 parts of Amoco H-1900 polybutene, 22.8 parts of composition A, 2.0 parts of oleic acid, and 60.0 parts of titanium dioxide.

The black colourant is made from 32.3 parts of the same polybutene, 48.45 parts of composition A, 4.25 parts of oleic acid, and 15.0 parts of carbon black.

EXAMPLES 6 & 7

Ink Systems

Example 6

The ink composition is as shown below.

| | |
|---|---|
| Paraffin wax standard product 155 (paraffin wax) | 83 wt % |
| EV AFLEX 210 (ethylene-vinyl acetate copolymer) | 10 wt % |
| Composition A | 5 wt % |
| Oil Black HBB (C.I. SOLVENT BLACK 3) | 2 wt % |

The normal room temperature solid wax of the vehicle is paraffin wax (paraffin wax standard product 155, manufactured by NIPPON SEIRO CO., LTD.) having a melting point of about 69° C. The resin of the vehicle is ethylene-vinyl acetate copolymer (EVAFLEX 210, manufactured by MITSUI POLYCHEMICALS CO., LTD.). The oil-soluble dye as the colorant is colour index (C.I.) SOLVENT BLACK 3 (Oil Black HBB, manufactured by Orient Chemical Co., Ltd.).

Paraffin wax, ethylene-vinyl acetate copolymer and Composition A are melted by heating at a temperature of about 70° C. to 250° C. to which C.I. SOLVENT BLACK 3 is mixed. Then, they are mixed under stirring at 200 to 10,000 rpm, preferably, 500 to 5,000 rpm by a dissolver. The composition mixed under stirring is filtered by using a 2-□m mesh filter by a hot-filtering device manufactured by ADVANTEC TOYO CO., LTD. to obtain a final hot melt ink.

2 to 3 droplets of the prepared hot melt ink is placed and melted on a slide glass heated to 120° C., on which a cover glass is placed and pressed slightly. Then, as a result of observation under transmission light by a microscope "XF-UNR" manufactured by NIKON CORPORATION, particles are scarcely observed. Accordingly, it is confirmed that most of C.I. SOLVENT BLACK 3 as the dye is dissolved substantially completely in the ink composition.

The hot melt ink obtained as described above can be used suitably as ink for a hot melt type ink jet printer.

When the ink is loaded to an ink jet printer and heated to an ink jetting temperature (100 to 150° C., preferably, 125 to 135° C.), the ink is melted rapidly. Then, as a result of ink jetting, satisfactory fixing performance on recording paper is shown. Further, when the ink is printed also on an OHP (Over Head Projector) film, it shows excellent transparency, and it is confirmed that the ink does not peel but is fixed firmly even when the film is flexed.

Example 7

The ink composition is as shown below.

| | |
|---|---|
| Hi-Mic 2065 (microcrystalline wax) | 35 wt % |
| Arkon P-90 (hydrogenated petroleum resin) | 53 wt % |
| Composition B | 10 wt % |
| NEOPEN BLUE 808 (C.I. SOLVENT BLUE 70) | 2 wt % |

The microcrystalline wax (Hi-Mic 2065, manufactured by NIPPON SEIRO CO., LTD.) has a melting point of about 75° C. The resin of the vehicle is hydrogenated petroleum resin (Arkon P-90, manufactured by ARAKAWA CHEMICAL INDUSTRIES, LIMITED). The oil-soluble dye as the colorant is color index (C.I.) SOLVENT BLUE 70 (NEOPEN BLUE 808, manufactured by BASF Co.).

The hot melt ink can be produced by the same procedures as those in Example 6.

2 to 3 droplets of the thus prepared hot melt ink is placed and melted on a slide glass heated to 120° C. on which a cover glass is placed and pressed slightly. Then, as a result of observation under transmission light by a microscope "XF-UNR" manufactured by NIKON CORPORATION, particles are scarcely observed. Accordingly, it is confirmed that most of C.I. SOLVENT BLUE 70 as the dye was dissolved substantially completely in the ink composition.

The hot melt ink can be used suitably as ink for a hot melt type ink jet printer.

When the ink is loaded to an ink jet printer and heated to an ink jetting temperature (100 to 150° C., preferably, 125 to 135° C.), the ink is melted rapidly. Then, as a result of ink jetting, satisfactory fixing performance on recording paper is shown. Further, when the ink is printed also on an OHP (Over Head Projector) film, it shows excellent transparency, and it is confirmed that the ink does not peel but is fixed firmly even when the film is flexed.

Example 8

Paint System

Polymerisations are carried out in a closed laboratory reactor with agitation. For each batch, the reactor is evacuated, and the ingredients are transferred to the reactor by vacuum. After the charge, the reactor is again evacuated five minutes and then pressurised to 10 psi (68.9 kPa) with nitrogen. Initial polymerisation temperature is about 52° C. and is allowed to rise to about 57° C. at 30–32 percent solids. Percent solids is checked at two-hour intervals. Reaction ingredients, conditions, and final product characteristics for a set of typical reactions are given in Table 1, and final product characteristics are given in Table 1.

TABLE 1

| INGREDIENTS | Sample No. | | | |
|---|---|---|---|---|
| (in parts) | 1 | 2 | 3 | 4 |
| Water | 190.0 | 190.0 | 148.0*** | 148.0 |
| Emulsifier | 3.0* | 3.0** | 3.0* | 3.0* |
| Metal Complexing Agent | | 0.05 | 0.1 | 0.1 |
| Sodium Acid Pyrophosphate | | 0.1 | 0.2 | 0.2 |
| $K_2S_2O_8$ (free radical catalyst) | 0.15 | 0.15 | 0.1 | 0.1 |
| Tert.-Mercaptan | 0.8 | 0.8 | 0.8*** | 0.8 |
| Styrene | 71.0 | 71.0 | 70.5 | 72.0 |
| Butyl Acrylate | 27.0 | 26.0 | 26.0 | 27.0 |
| Methacrylic Acid | | 1.0 | 3.5 | |
| Acrylic Acid | 2.0 | 2.0 | | 1.0 |
| Final % Solids | 34.3 | 34.7 | 40.0 | 39.6 |
| Final pH | 2.5 | 4.2 | 5.2 | 4.0 |
| Final Viscosity (cps) | 30 | 28 | 24 | 18 |
| Reaction Time (hrs) | 6.5 | 6 | 7 | 8 |

*Complex surfactant phosphate ester acid neutralised with NaOH to pH = 6.5, except pH = 3.0 for resin 2058. Surfactant used herein was Gafac RE410, a trademark of GAF Corporation for 2058, 1967 and 1965
**Linear alkyl sulfonate treated with $NH_4$OH to pH = 6.5.
***2.0 parts water and 0.4 parts of the mercaptan added at 20–22% solids.

The resins produced above are separated from the reaction product mixtures by coagulation and drying. The coagulant in each case was a mixture of about 20 grams alum (aluminium sulphate), about 5 grams sulphuric acid, about 10,000 milliliters of water. The temperature of the coagulation is about 50–60° C. The slurry resulting from each coagulation is filtered using a cloth-lined Buchner funnel.

After filtration, each resin cake is washed twice with cold soft water and then dried at 60° C. in an oven.

A coating composition prepared in accordance with the present invention is given in Table 2.

TABLE 2

| | |
|---|---|
| Resin | 24.9 g |
| (71 parts styrene, 26 parts butyl acrylate, 2 parts acrylic acid, 1 part methacrylic acid, see Table 1 Resin 2) | |
| Wetting Agent (2,4,7,9-tetramethyl-5-decyne-4,7-diol) | 0.1 |
| Triethylamine | 2.5 cc |
| Water | Variable |
| Water Insoluble/Water Soluble Solvent | Variable |
| Weight Ratio of Water Insoluble to Water Soluble Solvent | 0/100 20/80 |
| Composition C | 5.61 g |
| Solids (grams/50 cc) | 30.61–30.76 |

Water insoluble solvent = MIBK; water soluble solvent = ethylene glycol monobutyl ether; Defoamer (Nopco NDW, a trademark of Diamond Shamrock Corp.) used in small amounts (0.075–0.15 g) above 75 volume percent water. It is part of solids content and is the reason why solids is expressed as a range.

The composition prepared performs well as a paint.

A further coating composition prepared in accordance with the present invention is given in Table 3.

TABLE 3

| | |
|---|---|
| Resin | 24.9 g |
| (71 parts styrene, 26 parts butyl acrylate, 2 parts acrylic acid, 1 part methacrylic acid, see Table 1 Resin 2) | |
| Wetting Agent (2,4,7,9-tetramethyl-5-decyne-4,7-diol) | 0.1 g |
| Triethylamine | 2.5 cc |
| Water | Variable |
| Water Insoluble/Water Soluble Solvent | Variable |
| Weight Ratio of Water Insoluble to Water Soluble Solvent | 0/100 20/80 |
| Composition B | 5.61 g |
| Solids (grams/50 cc) | 30.61–30.76 |

Water insoluble solvent = MIBK; water soluble solvent = ethylene glycol monobutyl ether; Defoamer (Nopco NDW, a trademark of Diamond Shamrock Corp.) used in small amounts (0.075–0.15 g) above 75 volume percent water. It is part of solids content and is the reason why solids is expressed as a range.

The composition prepared performs well as a paint.

All publications mentioned in the above specification are herein incorporated by reference. Various modifications and variations of the described methods and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in chemistry or related fields are intended to be within the scope of the following claims. Reference is explicitly made to U.S. application Ser. No. 09/642,480, filed Aug. 18, 2000 pending, U.S. provisional application 60/167,923 filed Nov. 29, 1999 and UK application 9919683.5, filed Aug. 19, 1999 as well as PCT/IB00/01173 filed Aug. 9, 2000 and published as WO 01/14466 on Mar. 1, 2001 and designating the US. Each of these documents and all documents cited in this text (application cited documents) and all documents cited or referenced in application cited documents, and each product data-sheet for commercially available products mentioned herein, are hereby incorporated herein by reference.

What is claimed is:

1. A composition comprising i) a pigment ii) a compound having the formula

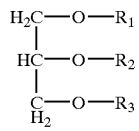

wherein $R_1$, $R_2$ and $R_3$ are independently selected from an acyl group or a hydrogen atom, wherein at least one of $R_1$, $R_2$ and $R_3$ is an acyl group (a short acyl group) having from 2 to 5 carbon atoms wherein at least one of $R_1$, $R_2$ and $R_3$ is a branched chain acyl group (a long acyl group) consisting of a chain having 10 to 20 carbon atoms and a hydrophilic branch group.

2. A composition according to claim 1 wherein the hydrophilic branch group is an acyl group or a derivative thereof.

3. A composition according to claim 2 wherein the hydrophilic branch group is a group of the formula

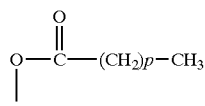

wherein p is from 0 to 3.

4. A composition according to claim 1 wherein two of $R_1$, $R_2$ and $R_3$ are the short acyl groups and wherein the other of $R_1$, $R_2$ and $R_3$ is a long acyl group.

5. A composition according to claim 1 wherein the chain of the long acyl group consists of a chain having 14 to 20 carbon atoms.

6. A composition according to claim 5 wherein the chain of the long acyl group consists of a chain having 16 to 20 carbon atoms.

7. A composition according to claim 1 wherein the short acyl group is an acyl group having from 2 to 5 carbon atoms.

8. A composition according to claim 7 wherein the short acyl group is an acyl group having 2 carbon atoms.

9. A composition according to claim 1 wherein the short acyl group is present in an amount, on average, of no greater than 2 moles per mole of glycerol and esters thereof.

10. A composition according to claim 1 wherein the long acyl group is present in an amount, on average, of at least 0.4 moles, preferably from 0.9 to 2 moles, more preferably from 0.9 to 1 moles per mole of glycerol and esters thereof.

11. A composition according to claim 1 wherein the total amount of the acyl groups is, on average, 2.7 to 3.0 moles per mole of glycerol and esters thereof.

12. A composition according to claim 1 wherein the compound is an acetylated interesterification product of glycerol and an oil selected from castor oil, including hardened castor oil, unhardened castor oil and mixtures thereof.

13. A composition according to claim 1 wherein the compound has the formula

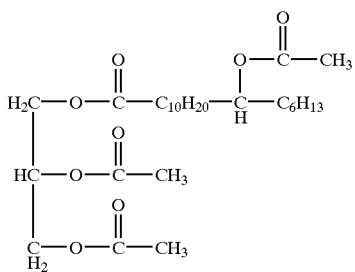

14. A composition according to claim 1 wherein the compound has the formula

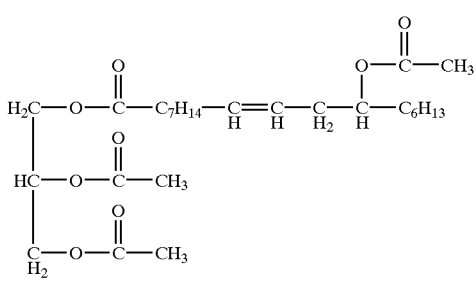

15. A composition according to claim 1 as substantially hereinbefore described.

16. The composition of claim 1 in a medium.

17. A method for preparing a composition according to claim 1 comprising admixing or contacting the pigment i) and the compound ii).

18. A method for dispersing a pigment or for improving pigment dispersing, comprising admixing or contacting the pigment with a compound ii) as in claim 1; optionally in a medium.

19. A kit for preparing a composition of claim 1 comprising the pigment i) and the compound ii) in separate packages or containers; optionally with instructions for admixture and/or contacting and/or use.

20. The kit of claim 19 further including a medium, wherein the medium can be included with the pigment, or with the compound, or with both the pigment and the compound, or in a separate package or container.

* * * * *